United States Patent [19]

Seidel

[11] 4,091,903

[45] May 30, 1978

[54] ROLLER CLUTCH WITH CENTRIFUGAL ENGAGER

[75] Inventor: Dieter Seidel, Munich, Germany

[73] Assignee: Stieber Praezision GmbH, Munich, Germany

[21] Appl. No.: 711,420

[22] Filed: Aug. 3, 1976

[30] Foreign Application Priority Date

Aug. 7, 1975 Germany .............................. 2535320

[51] Int. Cl.$^2$ .............................................. F16D 43/14
[52] U.S. Cl. ........................ 195/105 CF; 192/105 CE; 192/45
[58] Field of Search ...... 192/103 B, 105 CE, 105 CF, 192/45

[56] References Cited

U.S. PATENT DOCUMENTS

| 1,597,970 | 8/1926 | Hartley | 192/45 X |
|---|---|---|---|
| 2,215,548 | 9/1940 | Duffield | 192/45 X |
| 2,333,680 | 11/1943 | Schneider et al. | 192/105 CF X |
| 2,644,535 | 7/1953 | Koup et al. | 192/105 CE X |

FOREIGN PATENT DOCUMENTS 128,470  5/1949  Austria .................................. 192/45

*Primary Examiner* — Benjamin W. Wyche

[57] ABSTRACT

An over ride clutch having an inner and outer race, and clutch rollers disposed between the races and adapted for free-rolling or wedge engagement, depending on relative rotation of races. A centrifugal pin is located in the outer peripheral surface of the outer race, and this actuates a rocker arm, which in turn actuates driver rods, which are not affected by centrifugal force, which rods are capable of forcing the clutch roller into wedging condition.

8 Claims, 6 Drawing Figures

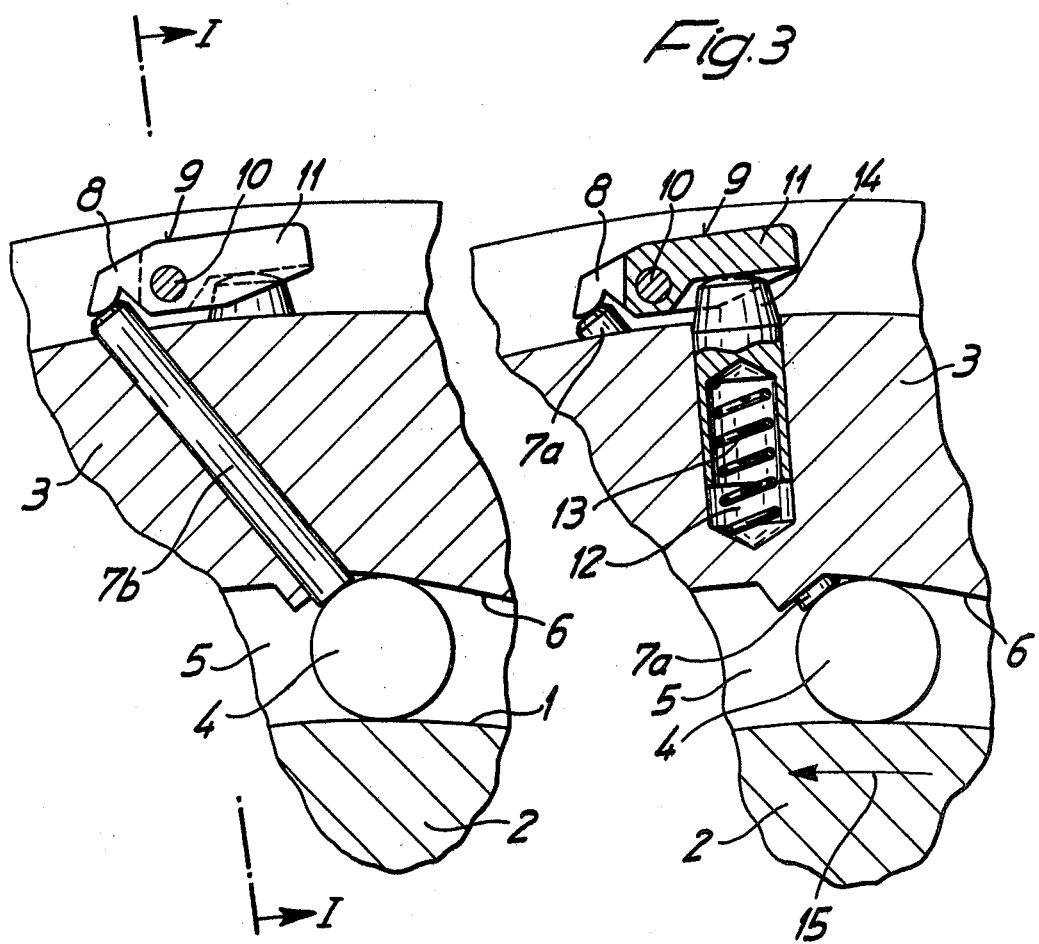

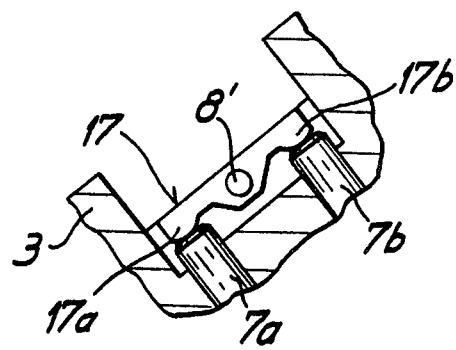
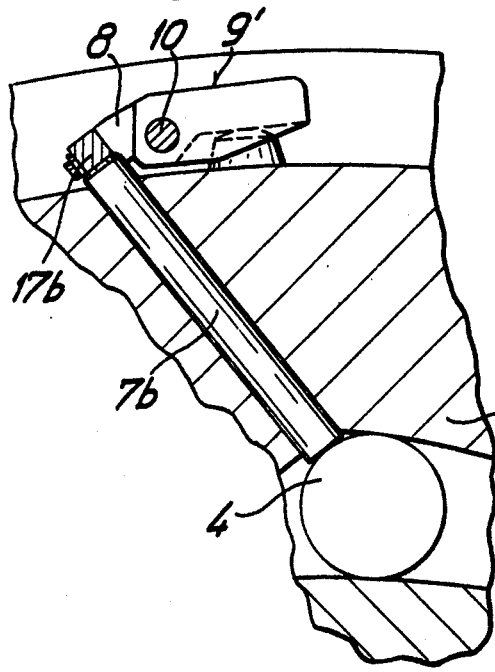
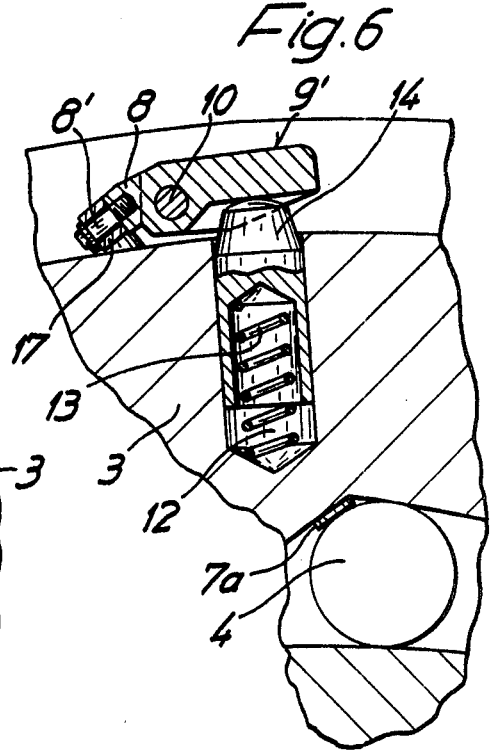

ROLLER CLUTCH WITH CENTRIFUGAL ENGAGER

This invention relates to a roller clutch with an over-running inner race which has a cylindrical rolling surface, and an outer race disposed thereon. Cylindrical clutch rollers are located between the inner and outer races. The inner surface of the outer race contains inclined ramps which form wedge-shaped cradles in which the clutch roller is located. As is well known in the art, when the inner and outer races tend to move in one direction, one with respect to the other, the clutch roller will be moved to the wide part of the wedge-shaped cradle, and the clutch roller will roll freely and the inner and outer races will not be locked together. When the inner and outer races tend to move in the opposite direction, one with respect to the other, the clutch roller will be forced into the narrow part of the wedge-shaped cradle, and the clutch roller will lock together the inner and outer races, causing both to rotate together.

The outer race contains in its outer periphery, centrifugal pins which are faced outwardly after the outer race reaches a pretermined rotational speed. The centrifugal pins operate through a system of face transmitting levers to urge the clutch rollers into the wedging condition, so that on attainment of a selected speed, the inner and outer races will be locked and will rotate together, regardless of direction of rotation.

The prior art disclosed centrifugally engaged clutches, but these generally employ centrifugally responsive cams disposed between the inner and outer races and between the clutch rollers. This has the disadvantage of occupying space resulting in the reduction in the number of clutch rollers that can be employed between the inner and outer races.

Another form of this invention shown in the prior art, the clutch rollers are carried in a cage. The centrifugally responsive cams are secured to the outer race and outer movement of the cams causes a turning movement of the cage, to put the clutch rollers into the wedging or engaging condition. In addition to the peripheral space requirement of this construction, there exists the further disadvantage of a high degree of precision required in the manufacture, making the construction very expensive.

The object of the present invention is to provide an improved over-run clutch in which clutch rollers can be set into engaging position by means of centrifugal force, and in which construction there is no clutch roller space lost to centrifugal responsive elements.

In the present invention, a rocker arm is attached to the periphery of the outer race, one arm of the rocker arm acts as a fly weight responsive to centrifugal force. Driver rods, influenced by the rocker arm, act against the clutch rollers forcing them into the wedged or engaging condition between the inner and outer races. By virtue of disposition of the rocker arm on the outside surface of the outer race, a greater centrifugal force can be obtained, than if the centrifugal sensitive element were located closer toward the center of the construction. This allows a greater force for actuation of the driver rods.

In the prior art constructions using centrifugally sensitive elements, in the space between the inner and outer races, there is a constant drag by the centrifugal elements or cams and this causes a wear between the inner and outer races, which is completely avoided by the present invention wherein there is no contact between the inner and outer races except for the clutch rollers. The present invention is therefore based on an entirely different principal.

The invention is disclosed in the accompanying drawings, wherein:

FIG. 2 is a clutch in partial cross-section viewed along lines II—II of FIG. 3;

FIG. 3 is a partial cross-sectional view of FIG. 2 viewed along lines III—III of FIG. 1;

FIG. 4 shows the rocker arm in front view; and

FIGS. 5 and 6 are further cross-sectional representations similar to FIGS. 2 and 3.

Figure 1:
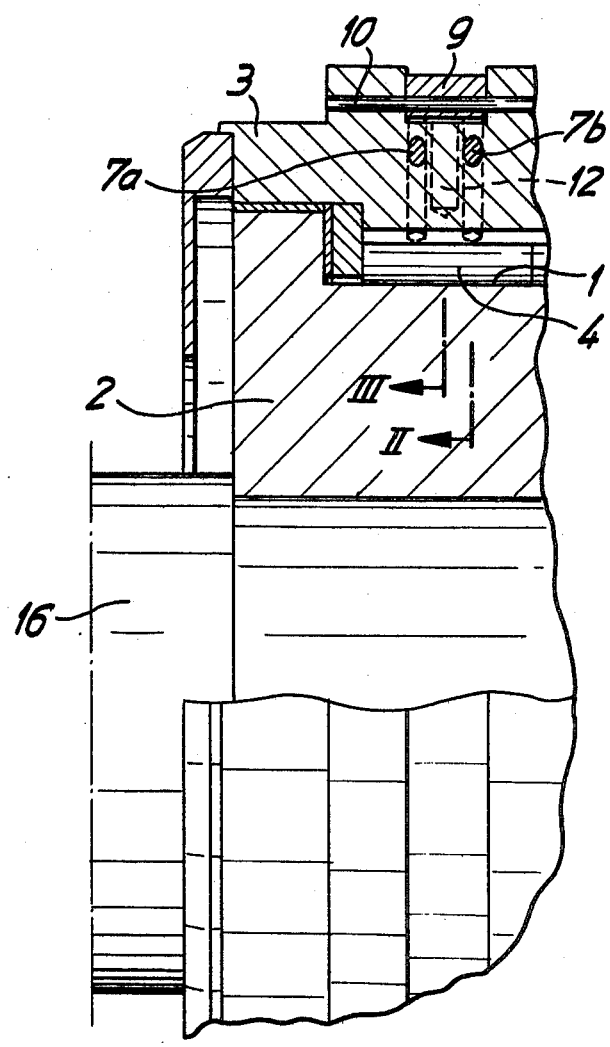
FIG. 1 is a partial axial sectional view of the over-ride clutch viewed along lines I—I of FIG. 2.

The over-ride clutch represented in FIGS. 1 through 3 has an inner race 2 having an outer cylindrical rolling surface 1. Clutch rollers 4 are disposed about the cylindrical rolling surface 1. Outer race 3 is concentrically disposed about the inner race and clutch rollers. The inner peripheral surface of outer race 3 contains inclined ramps 6 which form a wedge-shaped space between the inner and outer races.

As shown in FIGS. 1 and 2, the outer race contains a number of bored holes which support driver rods 7a and 7b, which are spaced a distance from each other. The rods are disposed outwardly but inclined away from the radial plane of the races. Rods 7a and 7b are engaged at their outer ends by arms 8 of rocker arm 9, which is pivotally mounted on pivot bolt 10 disposed near the outer perimeter of outer race 3. The rocker arm 9 contains, in addition to arm 8, a longer arm 11. The long arm 11 of the rocker arm 9 acts as a fly weight, being responsive to centrifugal force. When the outer race 3 is rotating, centrifugal force moves along arm 11 outwardly, causing a pivoting of rocker arm 9, and an inward movement of the short arm 8, forcing driver rods 7a and 7b to move inwardly. The rods act against clutch rollers 4 in an angular direction, forcing the rollers to the right, into clamping or wedging position, into the wedge-shaped cradle 5 formed between inner race 2 and outer race 3.

As shown in FIGS. 1 and 2, the outer race 3 further contains at its outer periphery, a series of radial pockets or bore holes 12. These are disposed between each pair of driver rods 7a and 7b. The inner end of the bore contains a pressure spring 13. A centrifugal pin 14 is positioned at the outer end of the spring. Because of the spring, centrifugal pin 14 always engaged the long arm 11 with a definite force. This causes the rocker arm 9 to pivot on bolt 10, and short arm 8 moves inwardly against drive arms 7a and 7b, which in turn exert an angular force against clutch rollers 4. In the at-rest position, the force of the driver rods against the clutch roller 4 is minimal, and the clutch roller is not displaced into the wedging position, unless this is caused by relative motion, as for example, if inner race 2 is moving in a counterclockwise position as shown by arrow 15 in FIG. 3.

When the over-ride clutch functions in a condition in which the outer race is driven at a high speed, then the centrifugal force will actuate the pin 14, the rocker arm 9 and the arms 7, and the clutch rollers will be forced into wedge condition, and the inner and outer races will be engaged, irrespective of their direction of rotation. When outer race 3 is driven at low speed, the centrifugal action will not be effective. In that condition, the outer race is rotating counterclockwise, wedging engagement of the clutch rollers will occur, and race 2 will also be turned in a counterclockwise direction. However, in that condition, when the outer race 3 is driven in a clockwise direction, there will be an override and inner race 3 will not be driven.

In another embodiment of the invention, as shown in FIG. 6 of the drawings, rocker arm 9' is distinguishable from the rocker arm 9 of the earlier described embodiment, in that free end 8' of its arm 8 includes a pivot on which is disposed a rocker 17 which is movble in a transverse direction to the rocker arm 9'. Rocker arm 17 includes ends 17a and 17b, shown in FIG. 4, and these engage the ends of driver rods 7a and 7b. By this construction, there is achieved a degree of flexibility of engagement of the driver rods. This construction permits a distribution of the force exerted on the clutch roller 4 which distribution might not occur if there are slight differences in the lengths of the rods 7a and 7b.

It can be appreciated that modifications in the rocker arm construction can be made, and these are contemplated within the scope of the present disclosure. The rocker arm could have a single short arm 8 operating against a single driver rod 7, which actuates a single ball 4 rather than a clutch roller 4 being in cylindrical form. The rocker arm 9 could also include two arms engaging two driver rods 7a and 7b, one arm being disposed at right angles with respect to the other and by means of which engagement of the driver rods can be obtained through actuation of the arm.

What is claimed is:

1. An over ride clutch comprising:
   an inner race;
   an outer race;
   a plurality of wedge-shaped cradles formed between said inner and outer races;
   a clutch roller disposed in each wedge-shaped cradle;
   a centrifugal force-responsive rocker arm mounted on the outer periphery of said outer race; and
   a pair of driver rods slidably disposed in non-radial positions in said outer race for engagement at their outer ends by said rocker arm, and for exerting a force against said clutch roller to move same into wedge condition in said wedge cradle, each driver rod of said pair being parallel with respect to each other and disposed in a plane parallel to the longitudinal axis of the over ride clutch.

2. An over ride clutch as claimed in claim 1, wherein said rocker arm is pivoted and includes:
   a long arm portion; and
   a short arm portion which is in contact with said pair of driver rods.

3. An over ride clutch as claimed in claim 2, comprising:
   a centrifugal pin slidably disposed in the outer periphery of said outer race for engagement with said long arm of said rocker arm; and
   a spring for urging said centrifugal pin outwardly into engagement with said long arm.

4. An over ride clutch as claimed in claim 1, wherein said clutch rollers are cylindrical.

5. An over ride clutch as claimed in claim 2, further comprising means for pivoting the short arm of said rocker arm to allow for unequal reaction against said engaging driver rods.

6. An over ride clutch as claimed in claim 5, wherein said short arm pivoting means comprises a further rocker arm pivoted transversely to the end of said short arm, the outer ends of said further rocker arm engaging the outer ends of said driver rods.

7. An over ride clutch as claimed in claim 1, comprising:
   a centrifugal pin slidably disposed in the outer periphery of said outer race for engagement with said rocker arm; and
   a spring for urging said centrifugal pin outwardly into engagement with said rocker arm.

8. An over ride clutch as claimed in claim 1, wherein said rocker arm is pivoted and includes:
   a long arm portion; and
   a short arm portion which is in contact with said pair of driver rods, and wherein a further rocker arm is pivoted transversely to said rocker arm, the outer ends of said further rocker arm engaging the outer ends of said pair of driver rods, so as to allow for distribution of the force exerted on the clutch roller.

* * * * *